(12) United States Patent
Soutter

(10) Patent No.: US 11,311,001 B1
(45) Date of Patent: Apr. 26, 2022

(54) DECORATIVE LIGHTING SYSTEM FOR TERRARIUM

(71) Applicant: Kre8tive Enterprises Pty Ltd, Bronte (AU)

(72) Inventor: Fiona Soutter, Bronte (AU)

(*) Notice: Subject to any disclaimer, the term of this patent is extended or adjusted under 35 U.S.C. 154(b) by 0 days.

(21) Appl. No.: 17/477,654

(22) Filed: Sep. 17, 2021

(51) Int. Cl.
| | |
|---|---|
| *A01K 63/06* | (2006.01) |
| *F16B 47/00* | (2006.01) |
| *A01K 63/00* | (2017.01) |
| *F21V 23/02* | (2006.01) |
| *F21V 33/00* | (2006.01) |
| *F21V 23/00* | (2015.01) |
| *F21W 131/308* | (2006.01) |

(52) U.S. Cl.
CPC ............ *A01K 63/06* (2013.01); *A01K 63/006* (2013.01); *F16B 47/00* (2013.01); *F21V 23/002* (2013.01); *F21V 23/023* (2013.01); *F21V 33/0028* (2013.01); *F21W 2131/308* (2013.01)

(58) Field of Classification Search
CPC ....... A01K 63/006; A01K 63/06; F16B 47/00; F21V 23/002; F21V 23/023; F21V 33/0028
See application file for complete search history.

(56) References Cited

U.S. PATENT DOCUMENTS

| | | | | |
|---|---|---|---|---|
| 5,211,469 A | * | 5/1993 | Matthias | ................. F21V 21/08 362/101 |
| 2012/0044713 A1 | * | 2/2012 | Chiang | ................. A01K 63/06 362/555 |
| 2014/0230741 A1 | * | 8/2014 | Allen | ..................... A01K 63/06 119/245 |
| 2020/0229405 A1 | * | 7/2020 | Lowry | .................. H05B 45/10 |

* cited by examiner

*Primary Examiner* — Thomas M Sember
(74) *Attorney, Agent, or Firm* — Rumit Ranjit Kanakia

(57) ABSTRACT

The present invention discloses a decorative lighting system for a terrarium having a lid and a body comprising: a plurality of lighting elements, each lighting element having a light source, and a decorative member to cover the light source; an electrical powering arrangement having a switch, at least one electrical wiring to electrically coupled with the plurality of lighting elements to be lit via the switch, the switch is adapted to be coupled to the lid of the terrarium in such a manner that the switch protrudes from the lid to be accessed by a user from outside; a plurality of stalks, each stalk of the plurality of stalks having a top end portion and a bottom end portion, the top end portion having an attaching mechanism to detachably attach the lighting element and the at least one electrical wiring; and plurality of suction cups.

20 Claims, 12 Drawing Sheets

DECORATIVE LIGHTING SYSTEM FOR TERRARIUM

BACKGROUND

Field of Invention

The present invention generally relates to lighting systems, and more particularly, to decorative lighting systems for an aquarium, terrarium, vivarium, or other closed glass containers or small vials.

Description of Related Art

A variety of planters, terrariums, garden containers and glass plant houses are used to grow new plants and flowers, as well as for planting and growing indoors, where cooler temperatures would otherwise prevent gardening outdoors. The decorative terrarium is a small imitation of the natural environment. Terrariums are utilized as a substitute for gardens in homes that are unable to accommodate them. Further, terrariums may also be used to incorporate artificial decorative plants in the houses for decorative purposes, and may include variety of lighting system. Terrariums may be divided into two categories that may be open decorative lighting terrarium and closed decorative lighting terrarium.

Decorative lighting system for the terrariums may not just cultivate plants, but may also decorate the interior magnificently and provide interior effects. Most terrarium lights are designed to give a pleasing illumination of the terrarium and its contents for viewing. The aquariums, gallon-size jars, plastic containers, fish bowls, spheres, decorative containers, and pop bottles are voluntarily available and easy to alter into the terrariums.

In some existing conventional lighting system for terrariums, LED lights are permanently glued inside the terrarium. Moreover, the conventional decorative lighting system may have limitations of being unable to control the light from outside the terrarium. Further, other conventional decorative lighting system for terrarium may use fairy lights that are also attached to the inside of the terrarium While there are numerous lighting systems for terrariums, there are none which effectively and efficiently light up the terrarium and the surrounding area. Further, an effective solution for using artificial lighting in such conditions is still needed to increase the ability to smoothly control the decorative terrarium.

SUMMARY

This disclosure describes a decorative lighting system for terrarium that is capable of lighting up an aquarium, terrarium, vivarium, or other closed glass containers or small vials.

An object of the present disclosure is to effectively control the light sources of the decorative lighting system for terrarium from outside.

An object of the present disclosure is to provide a decorative lighting system for terrarium which addresses the disadvantages and limitations of such existing lighting containers.

Yet another object of the present disclosure is to control the decorative lighting system for terrarium using an application installed on a user device.

Another object of the present disclosure is to provide a novel decorative lighting system which successively lights up with a plurality of lighting elements.

Embodiments in accordance with the present invention provide provided a decorative lighting system for a terrarium having a lid and a body. The decorative lighting system includes a plurality of lighting elements, each lighting element having a light source, and a decorative member to cover the light source. The decorative lighting system also includes an electrical powering arrangement having a switch. Further, the electrical powering arrangement having at least one electrical wiring to electrically coupled with the plurality of lighting elements to be lit via the switch. Moreover, the switch is adapted to be coupled to the lid of the terrarium in such a manner that the switch protrudes from lid to be accessed by a user from outside. The decorative lighting system also includes a plurality of stalks, each stalk of the plurality of stalks having a top end portion and a bottom end portion. Furthermore, the top end portion having an attaching mechanism to detachably attach the lighting element and the at least one electrical wiring. The decorative lighting system also includes a plurality of suction cups, each suction cup detachably coupled to the bottom end portion of the stalk. The plurality of suction cups is configured to detachably attach the plurality of stalks and respective lighting elements to inner walls of the body of the terrarium.

According to an embodiment of the present disclosure, the attaching mechanism at the top end portion includes a pair of slits formed along the top end portion to receive the at least one electrical wiring extending in the pair of slit. Further, the attaching mechanism at the top end portion also includes a top recess formed seamlessly in coordination with the pair of slits to receive the respective lighting elements.

According to an embodiment of the present disclosure, the top end portion of each stalk of the plurality of stalks having broader thickness than the bottom end portion. In such embodiments, the top end portion with the broader thickness may receive the plurality of lighting elements therealong, while the bottom end portion with a narrow thickness than the top end portion may receive the plurality of suction cups therealong.

According to an embodiment of the present disclosure, the decorative lighting system further includes a user device having a lighting control platform installed for controlling the decorative lighting system.

According to an embodiment of the present disclosure, the electrical powering arrangement include a power source to power the plurality of lighting elements, when the switch is switched 'ON'. In an embodiment of the present invention, the power source comprises one or more battery, a direct power supply, fuel cells, generators, an electrical outlet, an alternator, a solar power converter, a power supply integrated with wireless energy transfer, and so forth.

Disclosed herein is the power source that may be electrically coupled to the electrical powering arrangement at a predefined position including, one of a location on the lid or the body.

Disclosed herein is the power source that may be an independent power input source.

According to an embodiment of the present invention, each of the bottom end portion are pointed from a base of the bottom end portion to receive the suction cup.

According to an embodiment of the present invention, a length of each stalk is proportional to the size of the decorative member connected to the top end portion of the plurality of stalks.

According to an embodiment of the present invention, a type of the decorative member comprises, large mushrooms, small mushrooms, crystals, plants, gemstone, logs, twigs, rocks, candles, flowers, food displays, and so forth.

Embodiments in accordance with the present invention provide a decorative terrarium including a terrarium having a lid and a body. The decorative terrarium also includes a plurality of lighting elements, each lighting element having a light source, and a decorative member to cover the light source. The decorative terrarium also includes an electrical powering arrangement having a switch. Further, the electrical powering arrangement having at least one electrical wiring to electrically coupled with the plurality of lighting elements to be lit via the switch. Moreover, the switch is coupled to the lid of the terrarium in such a manner that the switch protrudes from lid to be accessed by a user from outside. The decorative terrarium also includes a plurality of stalks, each stalk of the plurality of stalks having a top end portion and a bottom end portion. The top end portion includes an attaching mechanism to detachably attach the lighting element and the at least one electrical wiring. The decorative terrarium also includes a plurality of suction cups, each suction cup detachably coupled to the bottom end of the stalk. The plurality of suction cups detachably attaches the plurality of stalks and the respective lighting elements to inner walls of the body of the terrarium.

According to an embodiment of the present disclosure, each stalk of the plurality of stalks includes the top end portion with an aperture have a broader thickness to accommodate the at least one electrical wiring. The aperture may be created for easy insertion of the at least one electrical wiring and be accommodated therein.

Embodiments in accordance with the present invention provide a method for making a decorative lighting system for a terrarium having a lid and a body. The method includes obtaining a plurality of lighting elements, each lighting element having a light source, and a decorative member to cover the light source. The method also includes obtaining an electrical powering arrangement, the electrical powering arrangement having a switch and at least one electrical wiring, the switch is adapted to be coupled to the lid of the terrarium in such a manner that the switch protrudes from the lid to be accessed by a user from outside. The method also includes electrically coupling the electrical powering arrangement with the plurality of lighting elements to be lit via the switch. The method also includes obtaining a plurality of stalks, each stalk of the plurality of stalks having a top end portion and a bottom end portion, the top end portion having an attaching mechanism. The method also includes detachably attaching detachably the lighting element and the at least one electrical wiring to the attaching mechanism. The method also includes obtaining a plurality of suction cups. The method also includes coupling detachably each suction cup to the bottom end portion of the stalk, wherein the plurality of suction cups is configured to detachably attach the plurality of stalks and respective lighting elements to inner walls of the body of the terrarium.

Embodiments in accordance with the present invention provide a method that includes forming a pair of slits along the top end portion to receive the at least one electrical wiring extending in the pair of slit. The method also includes forming a top recess seamlessly in coordination with the pair of slits to receive the respective lighting elements.

In one embodiment of the present disclosure, the method further includes: associating a user device having a lighting control platform for controlling the decorative lighting system.

In one embodiment of the present disclosure, the method further includes: receiving direct electricity supply into the at least one electrical wiring for lighting up the plurality of light sources without the requirement of the power source placement.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Like reference numerals refer to like parts throughout the description of several views of the drawing.

Figure 1:
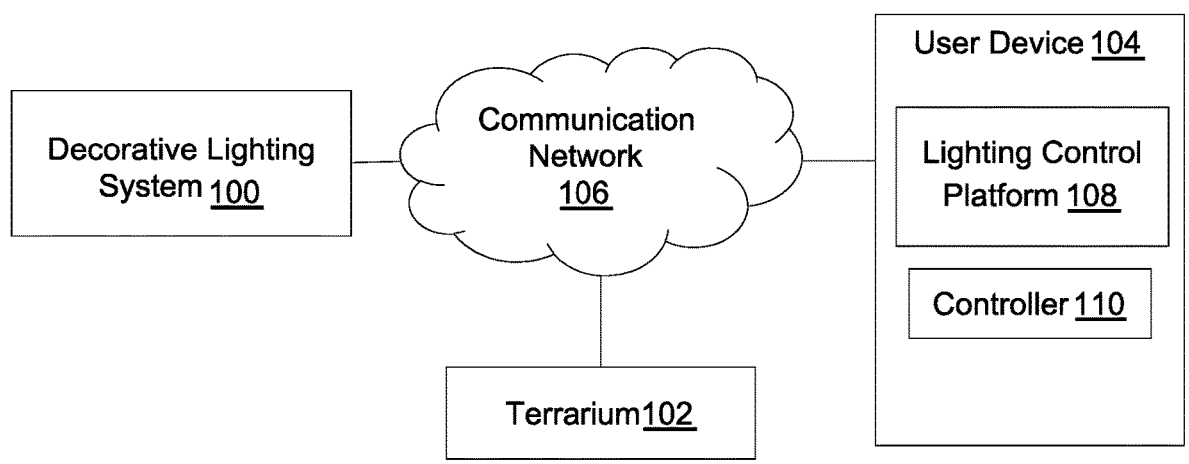
FIG. 1 illustrates a block diagram of a wireless system in which a decorative lighting system for a terrarium may be used, according to embodiments of the present invention disclosed herein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The following description includes the preferred best mode of one embodiment of the present invention. It will be clear from this description of the invention that the invention is not limited to these illustrated embodiments, but the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In any embodiment described herein, the open-ended terms "comprising," "comprises," and the like (which are synonymous with "including," "having" and "characterized by") may be replaced by the respective partially closed phrases "consisting essentially of," consists essentially of," and the like or the respective closed phrases "consisting of," "consists of", the like.

As used herein, the singular forms "a", "an", and "the" designate both the singular and the plural, unless expressly stated to designate the singular only.

FIG. 1 illustrates a block diagram of a wireless system in which a decorative lighting system for a terrarium may be used, according to one embodiment of the present invention. The decorative terrarium system 100 comprises a terrarium 102 and a user device 104, according to one embodiment of the present invention. Further, the decorative lighting system 100, the terrarium 102 and the user device 104 may be connected through a communication network 110, according to embodiments of the present invention.

According to embodiments of the present invention, the communication network 106 may include a data network such as, but not limited to, an Internet, a Local Area Network (LAN), a Wide Area Network (WAN), a Metropolitan Area Network (MAN), and so forth. In some embodiments of the present invention, the communication network 106 may include a wireless network, such as, but not limited to, a cellular network and may employ various technologies including an Enhanced Data Rates for Global Evolution (EDGE), a General Packet Radio Service (GPRS), and so forth. In some embodiments of the present invention, the communication network 106 may include or otherwise cover networks or sub-networks, each of which may include, for example, a wired or a wireless data pathway. According to an embodiment of the present invention, the decorative lighting system 100, the terrarium 102, and the user device 104 may be configured to communicate with each other by one or more communication mediums connected to the communication network 106. The communication mediums include, but are not limited to, a coaxial cable, a copper wire, a fiber optic, a wire that comprise a system bus coupled to a processor of a computing device, and so forth. Embodiments of the present invention are intended to include or otherwise cover any type of the communication mediums, including known, related art, and/or later developed technologies.

According to embodiments of the present invention, the terrarium 102 may be a miniature garden or an imitation of the natural environment inside a body 114 having a base of gravel, charcoal, moss, soil, small pebbles, and so forth. In an embodiment of the present invention, the terrarium 102 may comprise a lid 112 that may be incorporated detachably secured on the body 114. In another embodiment of the present invention, the terrarium 102 may be an open terrarium with no lid, such as the lid 112. In one of the embodiments of the present invention, the terrarium 102 may be substituted by an aquarium, a vivarium, a lamp, a glass bottle, other closed glass containers, small vials, and so forth.

According to embodiments of the present invention, the terrarium 102 may be a fish bowl, an old bottle, a glass jar, an enclosed glass, a plastic container, and so forth. According to embodiments of the present invention, the terrarium 102 may be made up of a material, such as, but not limited to, a glass, a plastic, a fiber sheet, and so forth. The body 114 of the terrarium 102 may preferably be transparent or translucent depending upon the user requirements. Embodiments of the present invention are intended to include or otherwise cover any type of the material for the terrarium 102 including known, related art, and/or later developed technologies.

According to an embodiment of the present invention, the user device 104 may be configured to enable a user to receive data and transmit data within the decorative lighting system 100. According to embodiments of the present invention, the user device 104 may be, but not limited to, a mobile device, a smart phone, a tablet computer, a portable computer, a laptop computer, a desktop computer, a smart device, a smart watch, a smart glass, and so forth. Embodiments are intended to include or otherwise cover any type of the user device 104, including known, related art, and/or later developed technologies.

Further, the user device 104 may comprise a lighting control platform 108 and a controller 110. The lighting control platform 108 may be configured to enable the user to control the decorative lighting system 100, according to an embodiment of the present invention. According to an embodiment of the present invention, the user device 104 may enable the user to input data for controlling the decorative lighting system 100. The lighting control platform 108 may be further configured to display output data associated with the decorative lighting system 100, in an embodiment of the present invention. Further, the lighting control platform 108 may be a light controlling application installed on the user device 104.

According to embodiment of the present invention, the lighting control platform 108 that may be installed on the user device 104 may be configured to provide an interface to a user for controlling other components of the decorative lighting system 100.

According to embodiments of the present invention, the user device 104 may further comprise the controller 110 that may be configured to receive data associated with the decorative lighting system 100 using the communication network 106. Further, the controller 110 may be configured to receive, transmit and process data associated with the decorative lighting system 100, in an embodiment of the present invention.

According to embodiments of the present invention, the controller 110 may be, but not limited to, a Programmable Logic Control unit (PLC), a microcontroller, a microprocessor, a computing device, a development board, and so forth. Embodiments of the present invention are intended to include or otherwise cover any type of the controller 110 including known, related art, and/or later developed technologies that may be capable of processing the received data.

Figure 2:
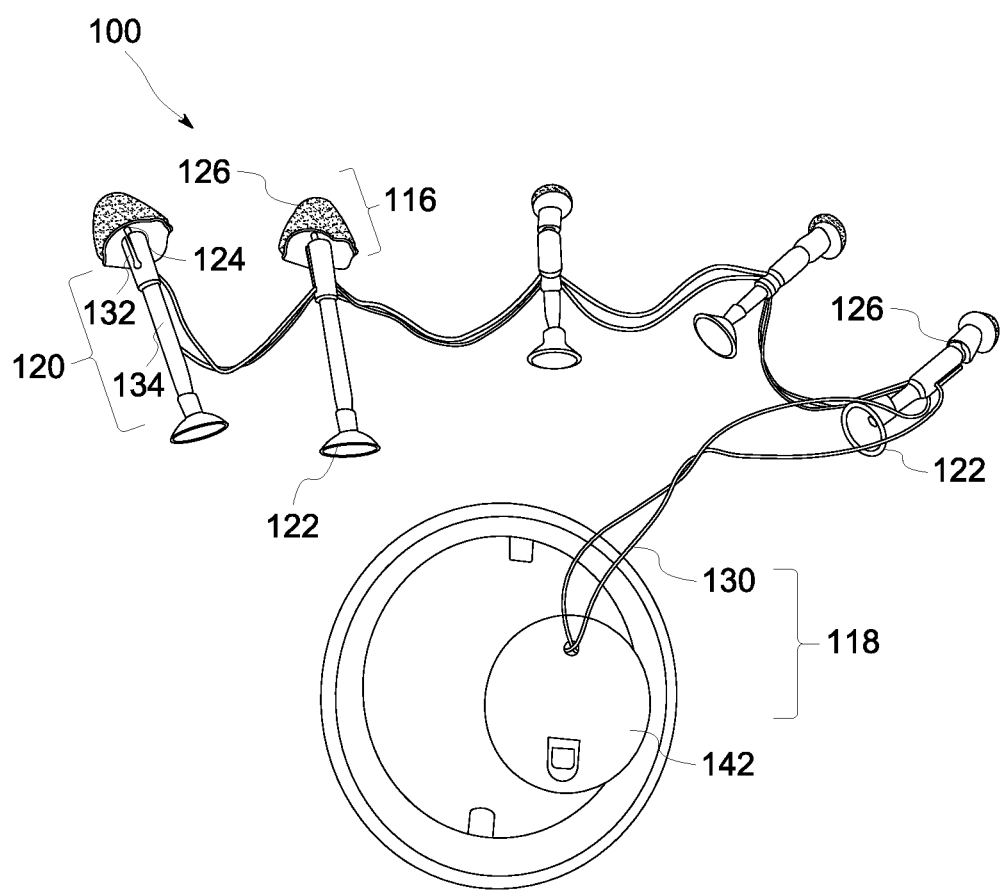
FIG. 2 illustrates a schematic representation of a decorative lighting system, according to embodiments of the present invention disclosed herein.
Figure 2A:
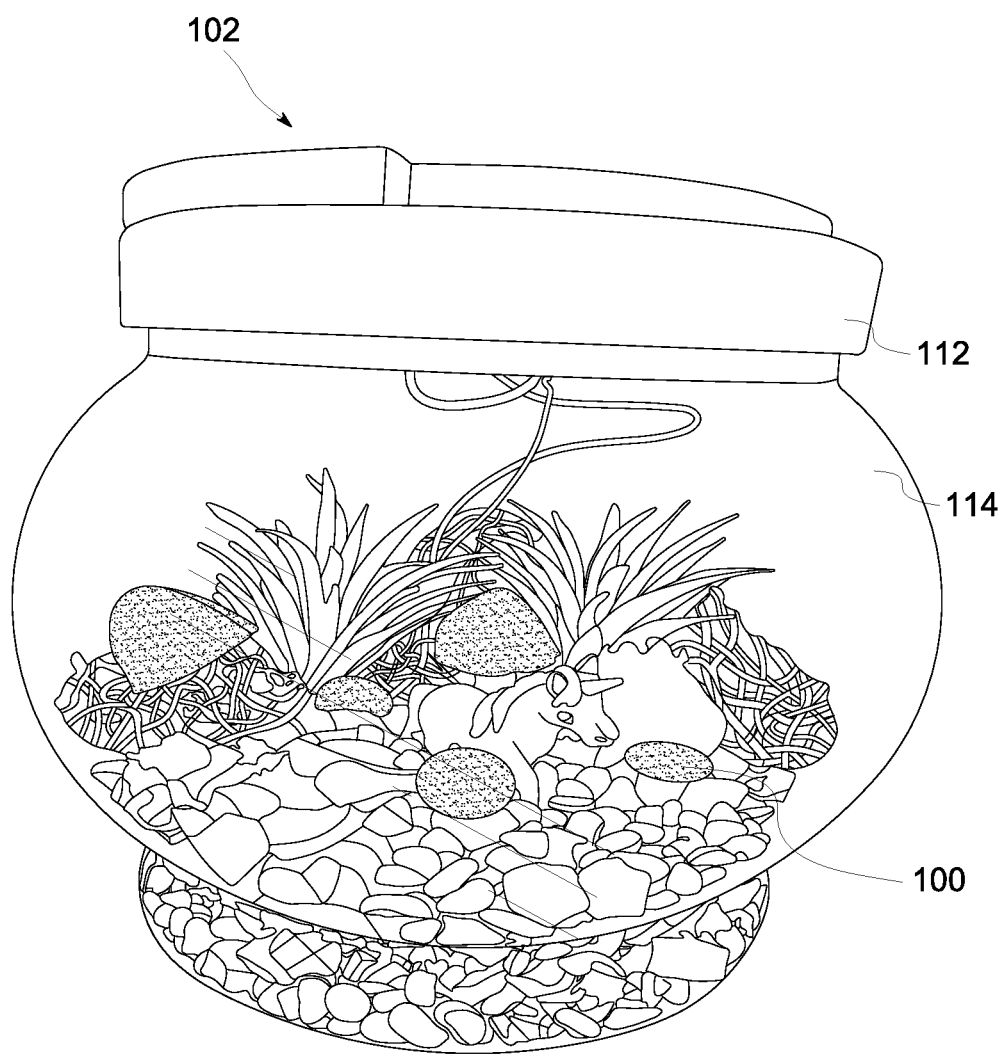
FIG. 2A illustrates a perspective view of the terrarium wherein a decorative lighting system is placed therein, according to embodiments of the present invention disclosed herein.
Figure 2B:
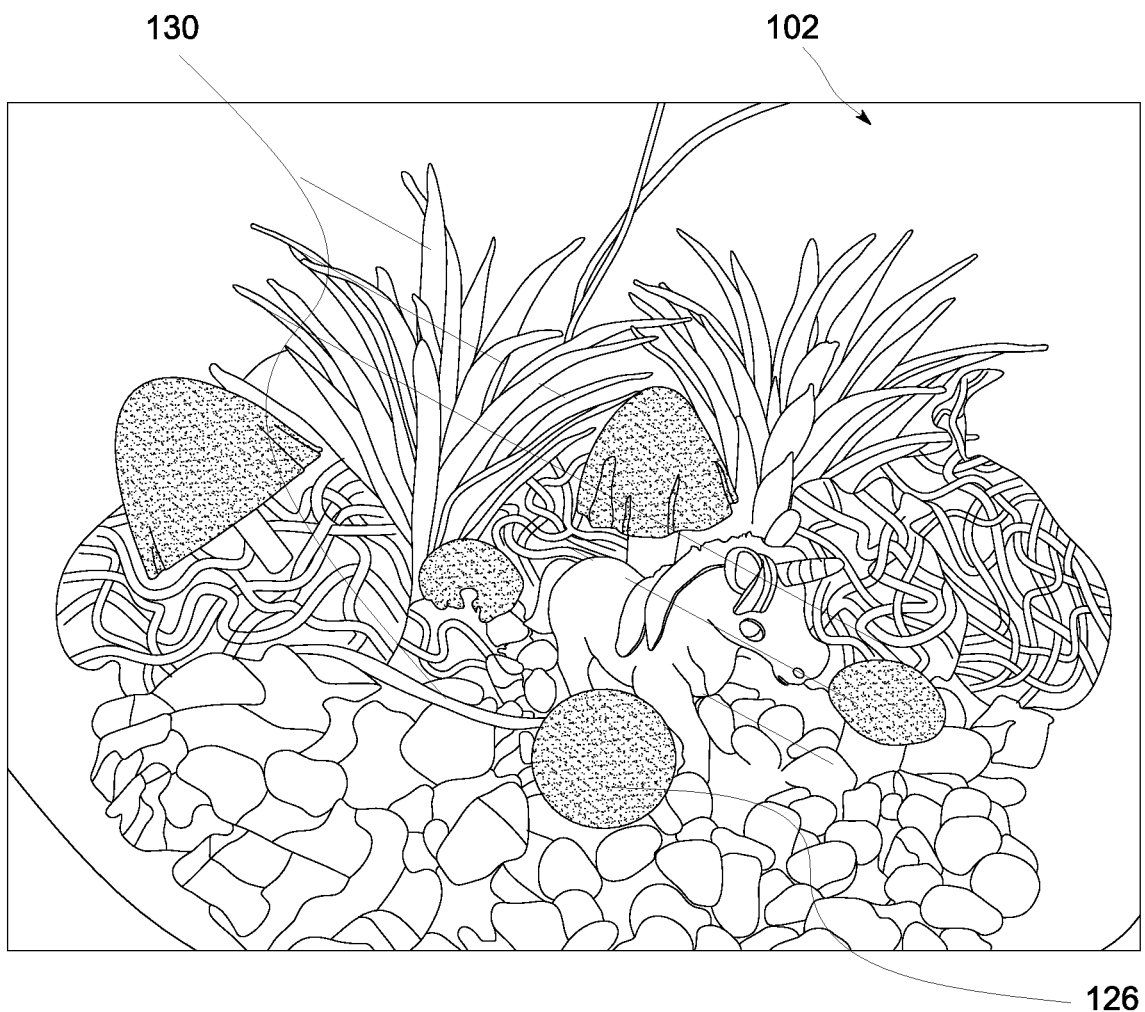
FIG. 2B illustrates a perspective view of the components of a decorative lighting system placed inside the terrarium, according to embodiments of the present invention disclosed herein.
Figure 2C:
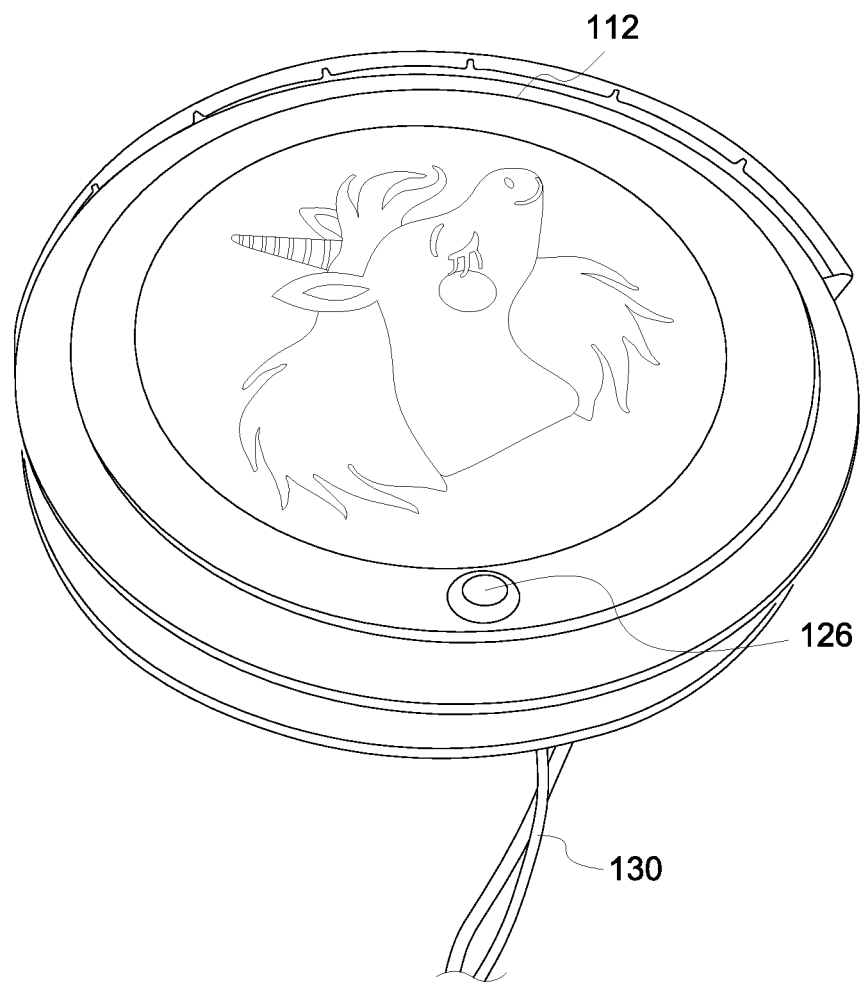
FIG. 2C illustrates a perspective view of the lid with a switch, according to embodiments of the present invention disclosed herein.
Figure 2D:
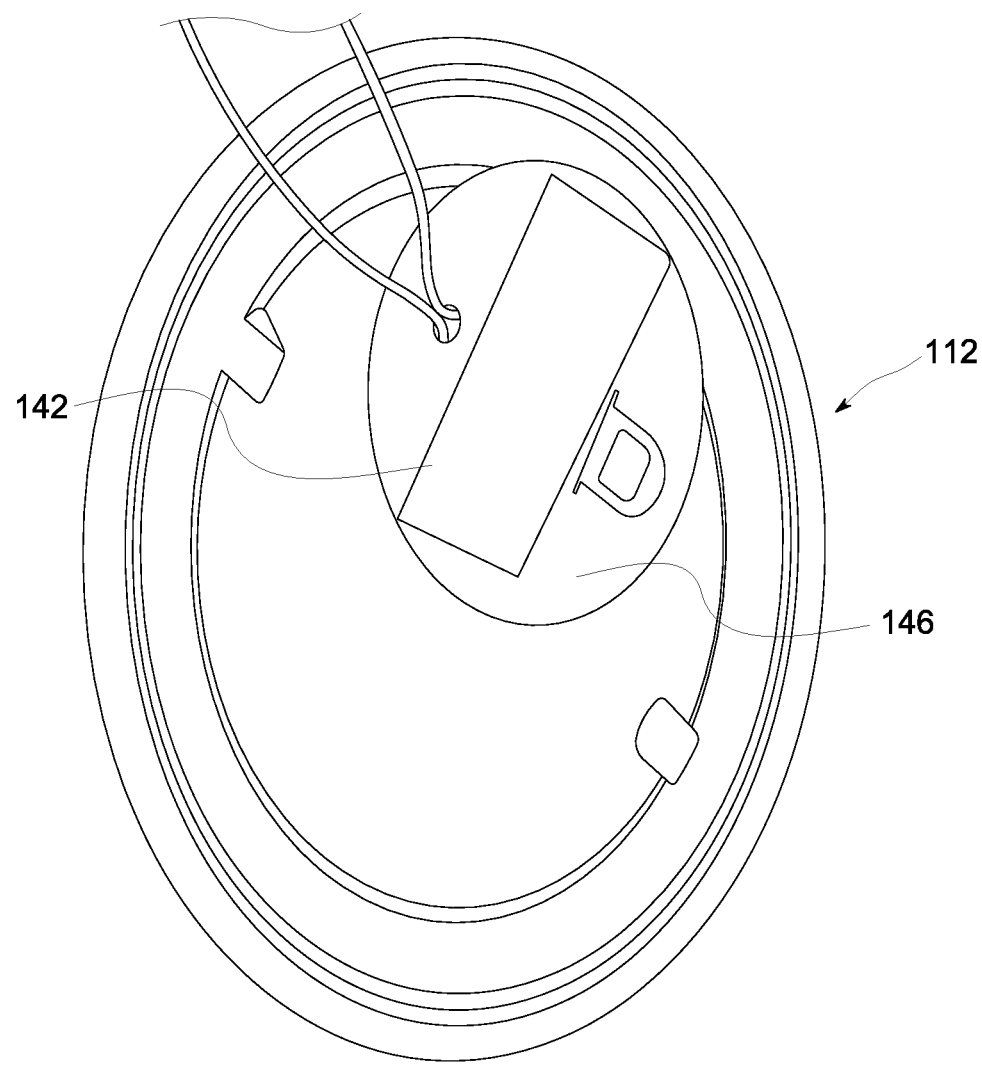
FIG. 2D illustrates a perspective view of the lid from below, according to embodiments of the present invention disclosed herein.
Figure 2E:
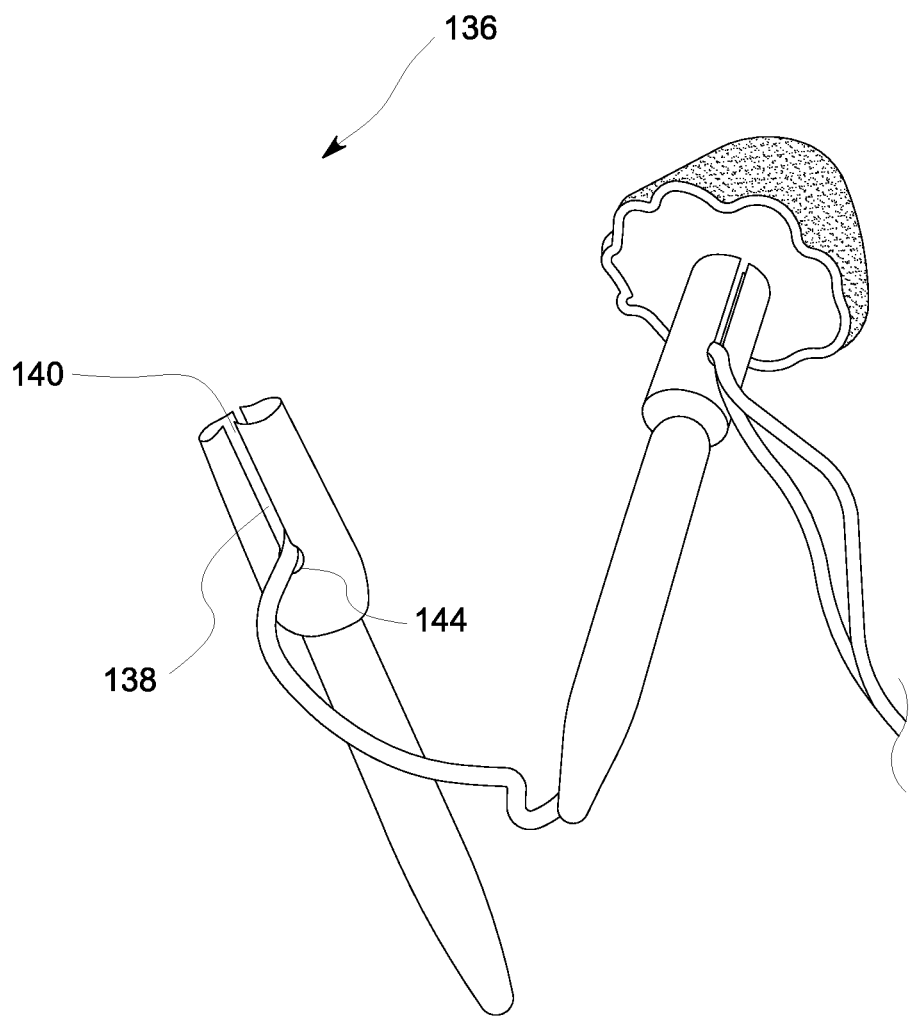
FIG. 2E illustrates a perspective view of the attaching mechanism present at the top end portion of each stalk, according to embodiments of the present invention disclosed herein.
Figure 2F:
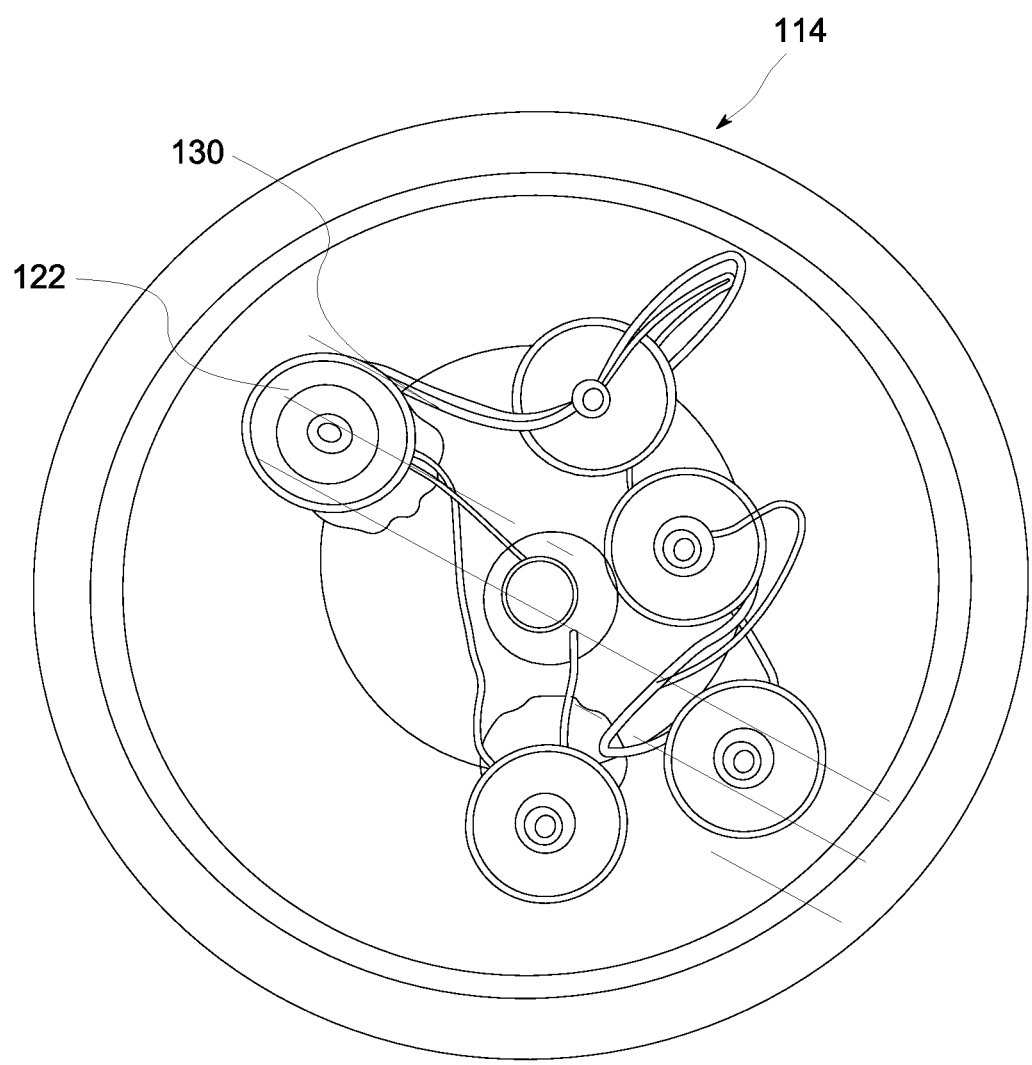
FIG. 2F illustrates a bottom view of the body of the terrarium, according to embodiments of the present invention disclosed herein.
Figure 2G:
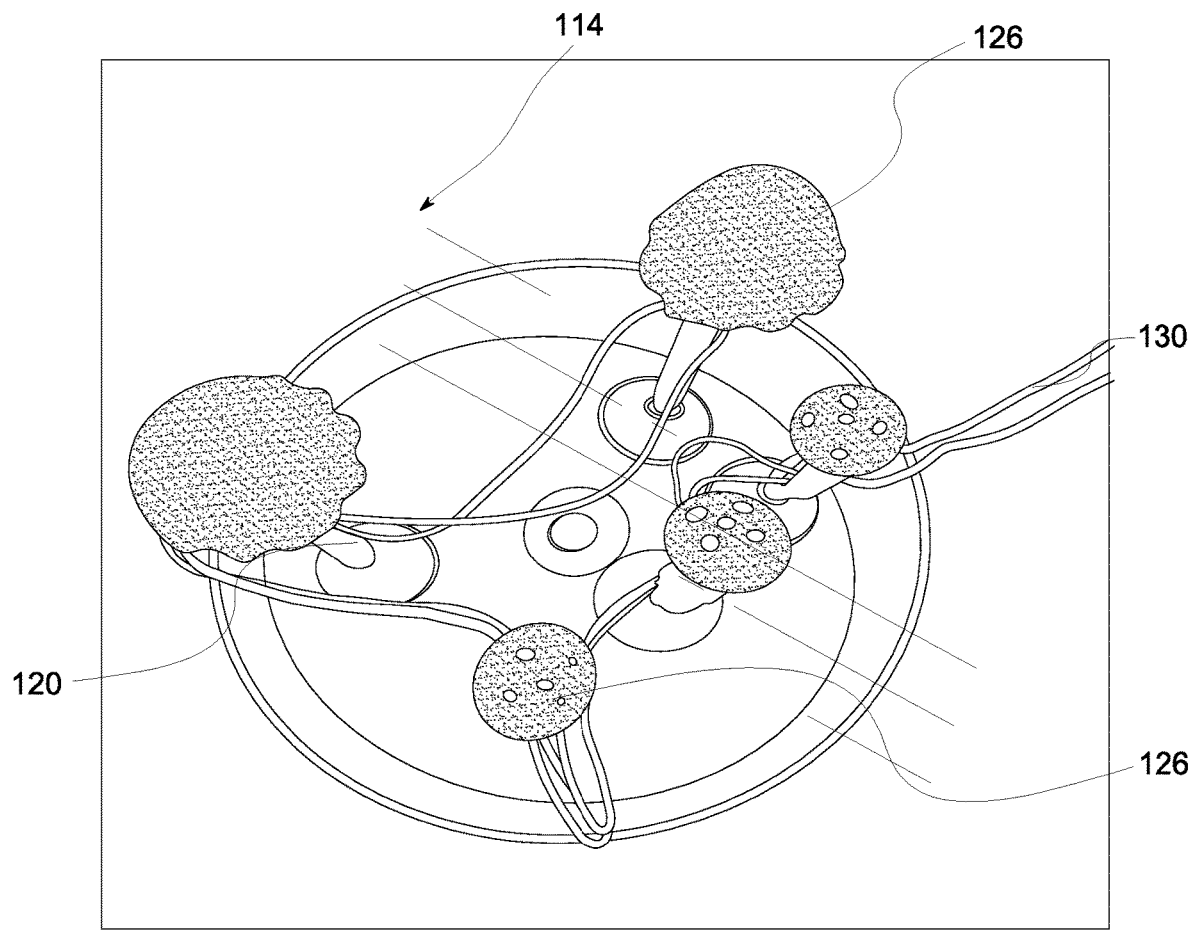
FIG. 2G illustrates a top view of the body of the terrarium, according to embodiments of the present invention disclosed herein.
Figure 2H:
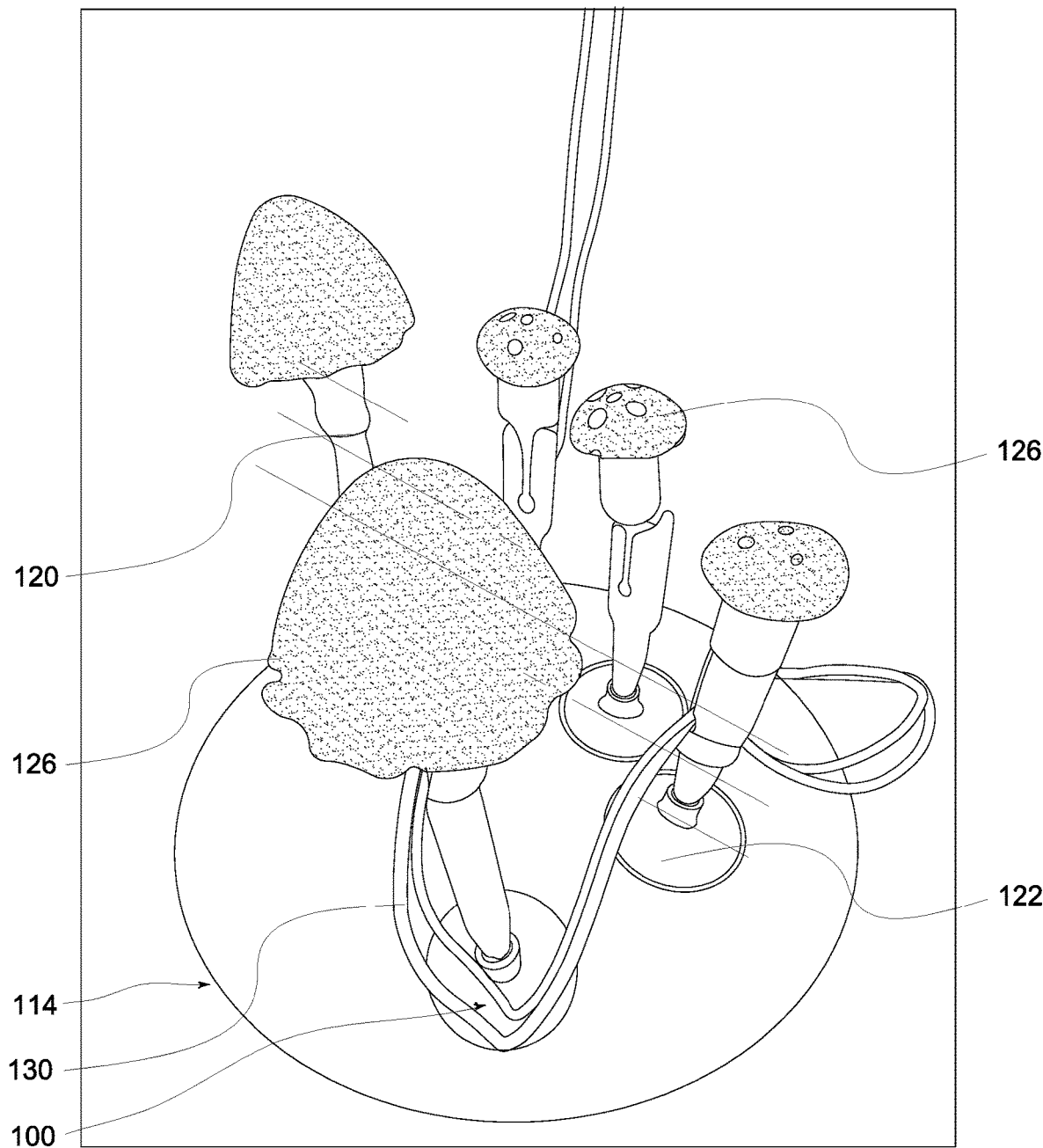
FIG. 2H illustrates an immersive view of the body of the terrarium, according to embodiments of the present invention disclosed herein.
Figure 2I:
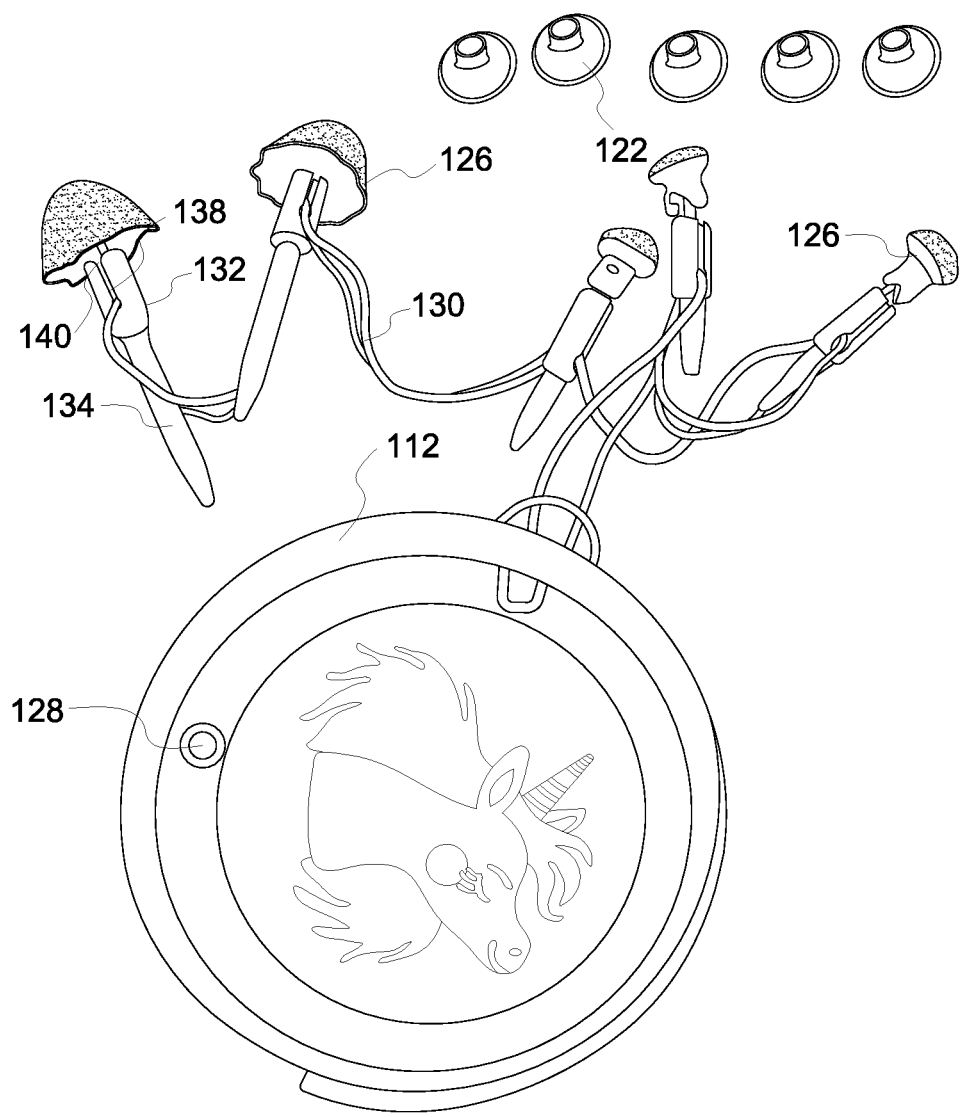
FIG. 2I illustrates a perspective view of the components of the decorative lighting system for the terrarium, according to embodiments of the present invention disclosed herein.

Referring now to FIG. 2, wherein a schematic representation of a decorative lighting system 100 is depicted, according to embodiments of the present invention. The decorative lighting system 100 may work independently, for example using a manual switch provided with the decorative lighting system 100, without the requirement of the user device 104 or the communication network 110, as described in FIG. 1. The decorative lighting system 100 will now be described in conjunction to FIGS. 2 to 2I. As seen, the decorative lighting system 100 may include a plurality of lighting elements 116, an electrical powering arrangement 118, a plurality of stalks 120, and a plurality of suction cups 122, according to one embodiment of the present invention. The decorative lighting system 100 may be used with or without the user device 104 or the communication network 110. Simply, the decorative lighting system 100 may be used via a switch and will be described herein in conjunction with FIGS. 2 to 2I, wherein various views of the decorative lighting system 100 are illustrated. For example, FIG. 2A illustrates a perspective view of the terrarium 102 wherein the decorative lighting system 100 is placed therein that is explained in detail with FIG. 2. Further, FIG. 2B illustrates a perspective view of the components of the decorative lighting system 100 placed inside the terrarium 102. FIG. 2C illustrates a perspective view of the lid 112 with the switch 130. Further, FIG. 2D illustrates a perspective view of the lid 112 from below. FIG. 2F illustrates a bottom view of the body 114 of the terrarium 102. FIG. 2G illustrates a top view of the body 114 of the terrarium 102. Further, FIG. 2H illustrates an immersive view of the body 114 of the terrarium 102. FIG. 2I illustrates a perspective view of the components of the decorative lighting system 100 for the terrarium 102. The decorative lighting system 100 will now be explained in details in conjunction to FIGS. 2 to 2I.

As seen in FIGS. 2 and 2A, the plurality of lighting elements 116 may be employed to light up the terrarium 102. In an embodiment of the present invention, each lighting element 116 may include a light source 124, and a decorative member 126. The decorative member 126 may be used to cover the light source 124. In one example, the light source 124 may be a light emitting diode (LED) light, a Condensed fluorescent light (CFL) bulb, an incandescent bulb, and so forth. Embodiments of the present invention are intended to include or otherwise cover any type of the light source 124 including known, related art, and/or later developed technologies. Further, in one example, the decorative member 126 may be a large mushroom, small mushroom, crystal, plant, gemstone, log, twig, rock, candle, flower, food display, and so forth. Embodiments of the present invention are intended to include or otherwise cover any type of the decorative member 126 including known, related art, and/or later developed technologies.

According to embodiments of the present invention, the electrical powering arrangement 118 may be an arrangement associated with the terrarium 102 for powering and controlling electrical energy. The electrical powering arrangement 118 may be installed in a backing member 146 that may be attached to one of a location on the lid or the body. In preferred embodiments of the present invention, the backing member 146 may comprise, the power source 142, the electrical powering arrangement 118, and so forth.

Further, the electrical powering arrangement 118 may include a switch 128, at least one electrical wiring 130. In an embodiment of the present invention, the electrical powering arrangement 118 may include the at least one electrical wiring 130 that may be electrically coupled with the plurality of lighting elements 116 to be lit via the switch 128.

Moreover, the switch 128 may be coupled to the lid 112 of the terrarium 102 in such a manner that the switch 128 may protrude from the lid 112 that may be further accessed by a user from outside. For example, the lid 112 may be incorporated with a through hole and the switch 128 may be adapted in the through hole from the underside of the lid 112 to project outward from the top side of the lid 112. Once the switch 128 may be secured in the through hole a backing support may be incorporated with the switch cover the through hole and the switch. The lid 112 may be convention lid at the home or shop or the lid 112 may be newly molded lid. In molded lid 112, in one another example, the switch 128 may also be molded to be obtained with the lid 112 having the molded switch 128 therein. The switch 128 may be a press button switch, a push button switch, a rotary switch, a toggle switch, a relay, a circuit breaker, and so forth. Embodiments of the present invention are intended to include or otherwise cover any type of the switch 128 including known, related art, and/or later developed technologies.

According to embodiments of the present invention, the electrical powering arrangement 118 may further comprise a power source 142 to power the plurality of lighting elements 116, when the switch 128 is switched 'ON'. The power source 142 may include one or more battery, a direct power supply, fuel cells, generators, an electrical outlet, an alternator, a solar power converter, a power supply integrated with wireless energy transfer, and so forth. Embodiments of the present invention are intended to include or otherwise cover any type of the power source 142 including known, related art, and/or later developed technologies.

In preferred embodiments of the present invention, the power source 142 may be electrically coupled to the electrical powering arrangement 118 at a predefined position that may be one of a location on the lid 112 or the body 114. In another embodiment of the present invention, the power source 142 may be an independent power input source. Further, the independent power input source may an electricity outlet with a direct current supply, an electrical outlet with an alternate current supply, and so forth. Embodiments of the present invention are intended to include or otherwise cover any type of the independent power input source including known, related art, and/or later developed technologies.

The plurality of stalks 120 of the decorative lighting system 100 may be coupled to the plurality of lighting element 116. Specifically, each stalk 120 may be associated with each of the decorative member 126 of each lighting element 116. Each stalk 108 of the plurality of stalks 120 may include a top end portion 132 and a bottom end portion 134. The top end portion 132 may include an attaching mechanism 136 to detachably attach the lighting element 116 and the at least one electrical wiring 130. FIG. 2E illustrates a perspective view of the attaching mechanism 136 present at the top end portion 132 of each stalk 120, according to embodiments of the present invention. Further, the attaching mechanism 136 at the top end portion 132 may include a pair of slits 138 and a top recess 140. The pair of slits 138 may be formed along the top end portion 132 to receive the at least one electrical wiring 130 extending in the pair of slits 138. Furthermore, the top recess 140 is formed seamlessly at the top end portion 132 in coordination with the pair of slits 138 to receive the respective lighting elements 116. Each stalk 120 of the plurality of stalks 120 may include the top end portion 132 having broader thickness than the bottom end portion 134. each stalk of the plurality of stalks includes the top end portion with an aperture 144 have a broader thickness to accommodate the at least one electrical wiring. The aperture 144 may be formed in continuation and below the pair of slits 138 and may include a circular shape for easy insertion and accommodation of the at least one electrical wiring 130 therein. The top end portion 132 with the broader thickness receives the plurality of lighting elements 116 therealong, while the bottom end portion 134 with a narrow thickness than the top end portion 132 receives the plurality of suction cups 122 therealong, and will be explained herein below.

In another embodiment of the present invention, the plurality of stalks 120 may be a plurality of connecting parts associated with the plurality of lighting elements 116. In an embodiment of the present invention, each type of the connecting parts associated with the plurality of lighting elements 116 may comprise, stalks, stems, straws, branches, any closed regular shape, any closed irregular shape, any irregular shape, and so forth. Embodiments of the present invention are intended to include or otherwise cover any type of the connecting parts including known, related art, and/or later developed technologies. In an embodiment of the present invention, each of the bottom end portion 134 may be pointed from a base of the bottom end portion 134 to receive the suction cup.

plurality of suction cups 122 may be associated with the plurality of stalks 120 for securing the lighting element 116 to a base of the terrarium 102. Each suction cup 122 may be detachably coupled to the bottom end 134 of the stalk 120. In an embodiment of the present invention, the plurality of suction cups 122 may detachably attaches the plurality of stalks 120 and the respective lighting elements 116 to inner walls of the body 114 of the terrarium 102. In preferred embodiments of the present invention, a length of each stalk 120 may be proportional to the size of the decorative member 126 connected to the top end portion 132 of the plurality of stalks 120.

According to embodiments of the present invention, as seen in FIG. 1, the decorative lighting system 100 may include the user device having a lighting control platform 108 installed on the user device for controlling the decorative lighting system 100. The lighting control platform 108 may further control the plurality of lighting elements 116, the electrical powering arrangement 118, and so forth.

Further, FIG. 2 also illustrates a perspective view of the decorative terrarium 100, according to embodiments of the present invention. The decorative terrarium 100 may comprise the terrarium 102, the plurality of lighting elements 116, the electrical powering arrangement 118, the plurality of stalks 120, and the plurality of suction cups 122 as described herein above and excluded herein from explanation for the sake of brevity.

Figure 3:
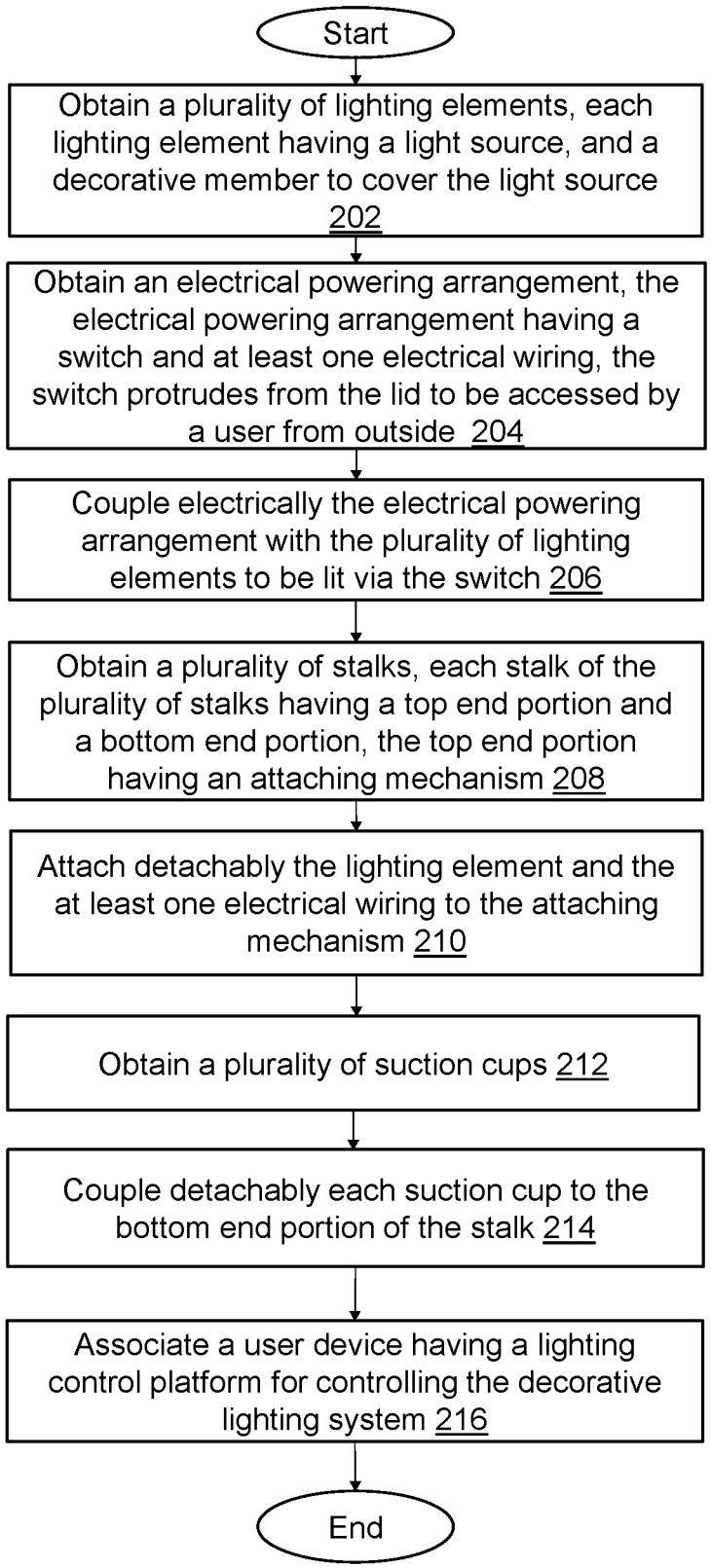
FIG. 3 illustrates a flowchart of a flowchart of a method for making the decorative lighting system for the terrarium having the lid and the body, according to embodiments of the present invention disclosed herein.

Referring now to FIG. 3 a flowchart of a method for making the decorative lighting system 100 for the terrarium 102 having the lid 112 and the body 114 is depicted, according to embodiments of the present invention.

At 202, the plurality of lighting elements 116 may be obtained. In an embodiment of the present invention, each lighting element 116 comprise the light source 124, and the decorative member 126. Further, the decorative member 126 may cover the light source. According to embodiments of the present invention, the decorative member 126 may comprise, a large mushroom, small mushroom, crystal, plant, gemstone, log, twig, rock, candle, flower, food display, and so forth. Embodiments of the present invention are intended to include or otherwise cover any type of the decorative member 126 including known, related art, and/or later developed technologies. According to embodiments of the present invention, the light source 124 may comprise a light emitting diode (LED) light, a Condensed fluorescent light (CFL) bulb, an incandescent bulb, and so forth. Embodiments of the present invention are intended to include or otherwise cover any type of the light source 124 including known, related art, and/or later developed technologies.

At 204, the electrical powering arrangement 118 may be obtained. Further, the electrical powering arrangement 118 may comprise the switch 128 and at least one electrical wiring 130. In an embodiment of the present invention, the switch 128 may be adapted to be coupled to the lid 112 of the terrarium 102 in such a manner that the switch 128 protrudes from the lid 112 to be accessed by a user from outside. According to embodiments of the present invention, the switch 128 type may comprise, a press button switch, a push button switch, a rotary switch, a toggle switch, a relay, a circuit breaker, and so forth. Embodiments of the present invention are intended to include or otherwise cover any type of the switch 128 including known, related art, and/or later developed technologies.

At 206, the electrical powering arrangement 118 may be electrically coupled with the plurality of lighting elements 116 to be lit via the switch 128. Further, direct electricity supply may be received into the at least one electrical wiring 130 for lighting up the plurality of light sources 124 without the requirement of the power source 142 placement. In an embodiment of the present invention, the electrical powering arrangement 118 may further comprise a power source 142 to power the plurality of lighting elements 116, when the switch is switched 'ON'. According to embodiments of the present invention, the power source 142 may comprise one or more battery, a direct power supply, fuel cells, generators, an electrical outlet, an alternator, a solar power converter, a power supply integrated with wireless energy transfer, and so forth. Embodiments of the present invention are intended to include or otherwise cover any type of the power source 142 including known, related art, and/or later developed technologies. In preferred embodiments of the present invention, the power source 142 may be electrically coupled to the electrical powering arrangement 118 at a predefined position comprising, one of a location on the lid or the body.

At 208, the plurality of stalks 120 may be obtained. In an embodiment of the present invention, each stalk 120 of the plurality of stalks 120 may comprise the top end portion 132 and the bottom end portion 134. In an embodiment of the present invention, the top end portion 134 may comprise the attaching mechanism 136. In an embodiment of the present invention, each stalk 120 of the plurality of stalks 120 may comprise the top end portion 132 having broader thickness than the bottom end portion 134.

At step 210, the lighting element 116 may be detachably attached with the at least one electrical wiring 130 through the attaching mechanism 136. In an embodiment of the present invention, the top end portion 132 may comprise an attaching mechanism 136 to detachably attach the lighting element 116 and the at least one electrical wiring 130. Further, the attaching mechanism 136 at the top end portion 132 may comprise a pair of slits 138 formed along the top end portion 132 to receive the at least one electrical wiring 130 extending in the pair of slits 138. Furthermore, the attaching mechanism 136 at the top end portion 132 may comprise the top recess 140 formed seamlessly in coordination with the pair of slits 138 to receive the respective lighting elements 116.

At step 212, the plurality of suction cups 122 may be obtained. the plurality of suction cups 122 may be associated with the plurality of stalks 120 for securing the lighting element 116 to a base of the terrarium 102.

At step 214, the plurality of suction cups 122 may detachably attaches the plurality of stalks 120 and the respective lighting elements 116 to inner walls of the body 114 of the terrarium 102. Each suction cup 122 may be detachably coupled to the bottom end 134 of the stalk 120. In preferred embodiments of the present invention, a length of each stalk 120 may be proportional to the size of the decorative member 126 connected to the top end portion 132 of the plurality of stalks 120.

At step 216, the decorative lighting system 100 may comprise the user device having a lighting control platform 108 installed on the user device for controlling the decorative lighting system 100. The lighting control platform 108 may further control the plurality of lighting elements 116, the electrical powering arrangement 118, and so forth.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements within substantial differences from the literal languages of the claims.

What is claimed is:

1. A decorative lighting system for a terrarium having a lid and a body, the decorative lighting system comprising:
    a plurality of lighting elements, each lighting element having a light source, and a decorative member to cover the light source;
    an electrical powering arrangement having a switch, the electrical powering arrangement having at least one electrical wiring to electrically coupled with the plurality of lighting elements to be lit via the switch, the switch is adapted to be coupled to the lid of the terrarium in such a manner that the switch protrudes from the lid to be accessed by a user from outside;
    a plurality of stalks, each stalk of the plurality of stalks having a top end portion and a bottom end portion, the top end portion having an attaching mechanism to detachably attach the lighting element and the at least one electrical wiring; and
    a plurality of suction cups, each suction cup detachably coupled to the bottom end portion of the stalk, wherein the plurality of suction cups is configured to detachably attach the plurality of stalks and respective lighting elements to inner walls of the body of the terrarium.

2. The decorative lighting system as claimed in claim 1, wherein the attaching mechanism at the top end portion comprises:
    a pair of slits formed along the top end portion to receive the at least one electrical wiring extending in the pair of slit; and
    a top recess formed seamlessly in coordination with the pair of slits to receive the respective lighting elements.

3. The decorative lighting system of claim 1, wherein the top end portion of each stalk of the plurality of stalks having broader thickness than the bottom end portion and that the top end portion with the broader thickness receives the plurality of lighting elements therealong, while the bottom end portion with a narrow thickness than the top end portion receives the plurality of suction cups therealong, wherein each of the bottom end portion are pointed along a base to receive the suction cup.

4. The decorative lighting system of claim 1, wherein the decorative lighting system comprises a user device having a lighting control platform installed for controlling the decorative lighting system.

5. The decorative lighting system of claim 1, wherein the electrical powering arrangement comprises a power source to power the plurality of lighting elements, when the switch is switched 'ON'.

6. The decorative lighting system of claim 5, wherein the power source comprises one or more battery, a direct power supply, fuel cells, generators, an electrical outlet, an alternator, a solar power converter, a power supply integrated with wireless energy transfer, and/or combination thereof.

7. The decorative lighting system of claim 5, wherein the power source is electrically coupled to the electrical powering arrangement at a predefined position comprising, one of a location on the lid or the body.

8. The decorative lighting system of claim 3, wherein each stalk of the plurality of stalks comprises the top end portion with an aperture having a broader thickness to accommodate the at least one electrical wiring.

9. The decorative lighting system of claim 1, wherein the length of each stalk is proportional to the size of the decorative member connected to the top end portion of the plurality of stalks.

10. The decorative lighting system as claimed in claim 1, wherein a type of the decorative member comprises, large mushrooms, small mushrooms, crystals, plants, gemstone, logs, twigs, rocks, candles, flowers, food displays, and/or a combination thereof.

11. A decorative terrarium comprising:
    a terrarium having a lid and a body;
    a plurality of lighting elements, each lighting element having a light source, and a decorative member to cover the light source;
    an electrical powering arrangement having a switch, the electrical powering arrangement having at least one electrical wiring to electrically coupled with the plurality of lighting elements to be lit via the switch, the switch is coupled to the lid of the terrarium in such a manner that the switch protrudes from the lid to be accessed by a user from outside;

a plurality of stalks, each stalk of the plurality of stalks having a top end portion and a bottom end portion, the top end portion having an attaching mechanism to detachably attach the lighting element and the at least one electrical wiring; and a plurality of suction cups, each suction cup detachably coupled to the bottom end portion of the stalk, wherein the plurality of suction cups detachably attaches the plurality of stalks and the respective lighting elements to inner walls of the body of the terrarium.

12. The decorative terrarium as claimed in claim 11, wherein the attaching mechanism at the top end portion comprises:

a pair of slits formed along the top end portion to receive the at least one electrical wiring extending in the pair of slit; and a top recess formed seamlessly in coordination with the pair of slits to receive the respective lighting elements.

13. The decorative terrarium of claim 11, wherein the electrical powering arrangement is configured to receive input power using a power source for lighting the decorative terrarium.

14. The decorative terrarium of claim 11, wherein the top end portion of each stalk of the plurality of stalks having broader thickness than the bottom end portion, and that the top end portion with the broader thickness receives the plurality of lighting elements therealong, while the bottom end portion with a narrow thickness than the top end portion receives the plurality of suction cups therealong, wherein each of the bottom end portion are pointed from a base of the bottom end portion and be inserted into each of the suction cup.

15. The decorative terrarium of claim 11 further comprising a user device having a lighting control platform installed for controlling the decorative lighting system.

16. The decorative terrarium of claim 11, wherein each stalk of the plurality of stalks comprises the top end portion with an aperture having a broader thickness to accommodate the at least one electrical wiring.

17. A method for making a decorative lighting system for a terrarium having a lid and a body, the method comprising the steps of:

obtaining a plurality of lighting elements, each lighting element having a light source, and a decorative member to cover the light source;

obtaining an electrical powering arrangement, the electrical powering arrangement having a switch and at least one electrical wiring, the switch is adapted to be coupled to the lid of the terrarium in such a manner that the switch protrudes from the lid to be accessed by a user from outside;

coupling electrically the electrical powering arrangement with the plurality of lighting elements to be lit via the switch;

obtaining a plurality of stalks, each stalk of the plurality of stalks having a top end portion and a bottom end portion, the top end portion having an attaching mechanism;

attaching detachably the lighting element and the at least one electrical wiring to the attaching mechanism;

obtaining a plurality of suction cups;

coupling detachably each suction cup to the bottom end portion of the stalk, wherein the plurality of suction cups is configured to detachably attach the plurality of stalks and respective lighting elements to inner walls of the body of the terrarium.

18. The method of claim 17, further comprising:

forming a pair of slits along the top end portion to receive the at least one electrical wiring extending in the pair of slit; and forming a top recess seamlessly in coordination with the pair of slits to receive the respective lighting elements.

19. The method of claim 17, further comprising: associating a user device having a lighting control platform for controlling the decorative lighting system.

20. The method of claim 17, further comprising: receiving direct electricity supply into the at least one electrical wiring for lighting up the plurality of light sources without the requirement of the power source placement.

\* \* \* \* \*